United States Patent [19]

Hawkins et al.

[11] Patent Number: 5,088,724

[45] Date of Patent: * Feb. 18, 1992

[54] GROUND SURFACE MATERIAL

[75] Inventors: Paul Hawkins, Leicester; Robert J. Blythe, Birmingham, both of England

[73] Assignee: En-Tout-Cas Plc., Leicester, United Kingdom

[*] Notice: The portion of the term of this patent subsequent to Nov. 6, 2007 has been disclaimed.

[21] Appl. No.: 585,223

[22] Filed: Sep. 19, 1990

[30] Foreign Application Priority Data

Sep. 21, 1989 [GB] United Kingdom ............... 8921367
Jul. 19, 1990 [GB] United Kingdom ............... 9015870

[51] Int. Cl.$^5$ ............................................. A63J 3/00
[52] U.S. Cl. ............................................ 272/3; 272/5; 106/277; 428/404; 428/407; 524/62; 252/88; 252/311.5
[58] Field of Search ........................................ 272/3-5; 106/83, 84, 277, 901; 252/88, 311.5; 524/62, 59, 270, 274; 428/403-407, 443

[56] References Cited

U.S. PATENT DOCUMENTS 4,968,024 11/1990 Hawkins ........................... 272/3

Primary Examiner—Richard E. Chilcot, Jr.
Attorney, Agent, or Firm—Spensley Horn Jubas & Lubitz

[57] ABSTRACT

A substitute ground surface material comprising sand coated or treated with a binder comprising a free flowing extender oil with a viscosity transition below −5° F., with a synthetic polymeric material such as styrene-butadiene-styrene co-polymer dissolved or dispersed in the oil. The binder comprises approximately 2% of the material which is an inert, discreet material permanently capable of being raked when laid in a layer upon a substrate. The material is laid on a suitable porous base to form a sports surface for a horse running track or the like.

17 Claims, No Drawings

GROUND SURFACE MATERIAL

The present invention relates to a ground surface material and particularly, though not exclusively, to a material for use as a sports surface such as a horse racing track.

BACKGROUND OF THE INVENTION

U.S. Pat. Nos. 4792133 and 4852870 disclose substitute ground surface materials comprising sand and other particulate material which is coated with a binder formed from an oil having the consistency of a soft grease at normal temperatures with a polymer dissolved or dispersed therein. The oil is typically a petroleum oil fraction having a viscosity of about 10000 centipoise at 20° C. and typical polymers are ethyl vinyl acetate, polystyrene, nylon, polypropylene, poly vinyl chloride and styrene-butadiene-styrene copolymers included in amounts of about 1 part polymer to 9 parts oil. The material typically comprises dry sand and binder in a ratio of 100:6.5.

These materials suffer from the problem that their physical properties are mainly dictated by the properties of the oil in the binder and soft greases typically change to free flowing oils at about 85° F. This means that when high climatic temperatures are encountered, the properties of the material can change dramatically.

It is an object of the present invention to provide a ground surface material which is better able to retain its desired properties at high and low climatic temperatures.

SUMMARY OF THE INVENTION

In accordance with the present invention, there is provided a substitute ground surface material comprising sand or similar particulate or granular material treated with a binder comprising an extender oil having a polymeric material dissolved or dispersed therein, the oil being free flowing at ambient temperatures so as to produce an inert discrete material capable of being raked when laid in a layer upon a substrate.

It has been found that by using an oil whose abrupt change in viscosity is at a much lower temperature than that of the hitherto used oils, combined with certain polymers, a much greater degree of stability can be obtained.

Preferably, the extender oil has a viscosity transition below -5° F. and has approximately uniform viscosity above this. Typical oils are free flowing aromatic, paraffinic or napthenic oils. One suitable oil is marketed under the name Prospect 380. In addition, any aromatic rubber extender oil with broadly a similar viscosity profiled to Prospect 380 may be used. Typical oils are Telura 126 and 171 (Exxon) and Cariflux 510 and LP (Shell).

The polymer is preferably a block co-polymer such as styrene-butadiene-styrene (S.B.S.), or a polymer or co-polymer having similar properties such as polypropylene, polyethylene and polyalphaolefins. One form of polyalphaolefin which is suitable is Vestoplast (trademark). The polymer must remain sufficiently resilient throughout the normal temperature range to retain the desired properties of the material. Consequently, an appropriate polymer would not suffer from excessive crystallinity at low temperatures which would reduce its resilience and would be resistant to degradation at higher temperatures.

A typical binder composition may comprise between 10% and 60% by weight polymer, with preferred ranges being 20% to 60%, 20% to 40% or 40% to 60% by weight, the remainder being extender oil. Advantageously the composition comprises about 40% polymer. The binder itself may form between 2% and 6.5% by weight of the ground surface material, with a preferred range being 2% to 4%.

Advantageously, various additives such as antioxidants, antiozonants, ultraviolet inhibitors and transition metal chelators may be added to the binder formulation to improve longevity.

The present invention is now described by way of example only.

EXAMPLE

A batch of sand of varying size in as-dug condition is dried and treated or coated with a binder comprising 40% by weight SBS (Europrene Sol T168 - Enichem Ltd.) and 60% extender oil (Prospect 380 - Carless Refining). The sand and binder mixture comprises 98% by weight dried sand and 2% binder.

The binder is formed by heating the extender oil to approximately 120° C. in a thermally insulated holding tank whilst being continuously agitated. The polymer, in the form of pellets, is slowly added to the agitated oil to effect rapid and thorough dissolution. When all of the polymer has been dissolved and the viscosity of the binder solution is uniform throughout, the binder is available for use.

The dry sand is heated to approximately 120° C. and the binder is added and thoroughly mixed.

The resulting mixture can be laid to a depth of 15-20 cm as a superstrate over a suitable porous base to give a surface which provides a running surface for horses having a sufficient amount of "give" to prevent excessive jarring yet still providing a degree of reaction to assist in the next stride. The surface can be maintained by raking and light rolling to restore the properties of the surface if it is excessively distorted in use and to remove any water held in the surface.

It would appear that the properties of the binder are controlled by the polymer. Examples of other suitable extender oils are: Telura 126 or 171 (Exxon) and Cariflux 510 or LP (Shell).

We claim:

1. A substitute ground surface material comprising sand or similar particulate or granular material treated with a binder comprising an extender oil having a polymeric material dissolved or dispersed therein, the oil being free flowing at ambient temperatures so as to produce an inert discrete material capable of being raked when laid in a layer upon a substrate, wherein the material comprises between approximately 2% and 6.5% of binder.

2. A material as claimed in claim 1 wherein said polymeric material is a block co-polymer.

3. A material as claimed in claim 2 wherein said polymeric material is a styrene-butadiene-styrene co-polymer.

4. A material as claimed in claim 1 wherein said polymeric material is a polyalphaolefin.

5. A material as claimed in claim 1 wherein said polymeric material is polypropylene or polyethylene.

6. A material as claimed in claim 1 wherein said free flowing extender oil is an organic oil having aromatic functional groups.

7. A material as claimed in claim 1 wherein said free flowing extender oil is a paraffinic oil.

8. A material as claimed in claim 7 wherein said free flowing extender oil is a naphthenic oil.

9. A material as claimed in claim 1 wherein said free flowing extender oil has a viscosity transition below −5° F. and approximately uniform viscosity above this temperature.

10. A material as claimed in claim 1 wherein said binder comprises between 10% and 60% of polymeric material, the remainder being said free flowing extender oil.

11. A material as claimed in claim 10 wherein said binder comprises between 20% and 40% of polymeric material.

12. A material as claimed in claim 10 wherein said binder comprises approximately 40% polymeric material.

13. A material as claimed in claim 1 comprising between 2% and 6.5% of binder.

14. A material as claimed in claim 13 comprising 2% and 4% of said binder.

15. A material as claimed in claim 14 comprising 98% dried sand and 2% binder.

16. A material as claimed in claim 1 wherein said binder includes at least one additive selected from the group comprising antioxidants, antiozonants, ultra violet inhibitors and transition metal chelators.

17. A surface for sports activities comprising a porous base material and a substitute ground surface material as claimed in claim 1.

* * * * *